Dec. 10, 1957
M. M. CHECK ET AL
2,815,975
FLUSH BOLT FOR A DOOR
Filed Aug. 16, 1955
2 Sheets-Sheet 1
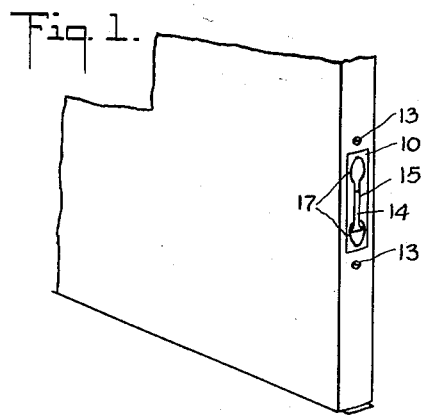
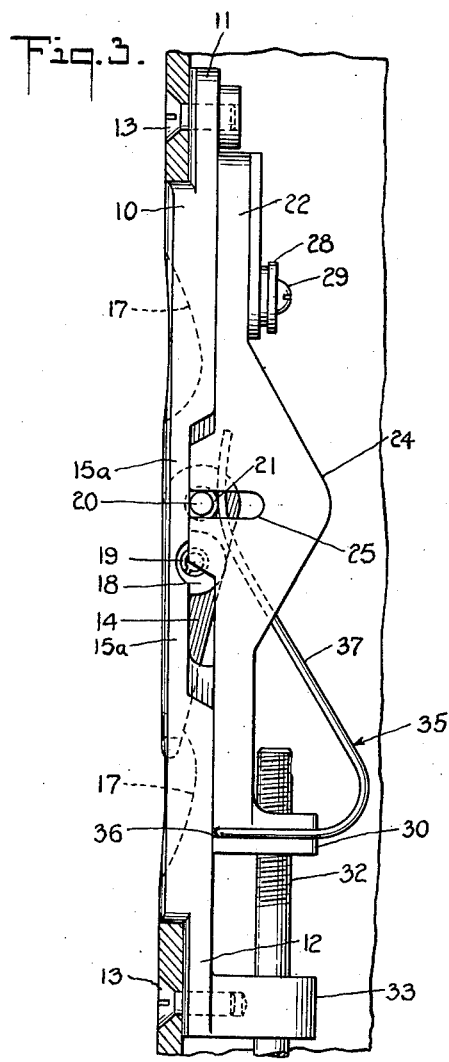
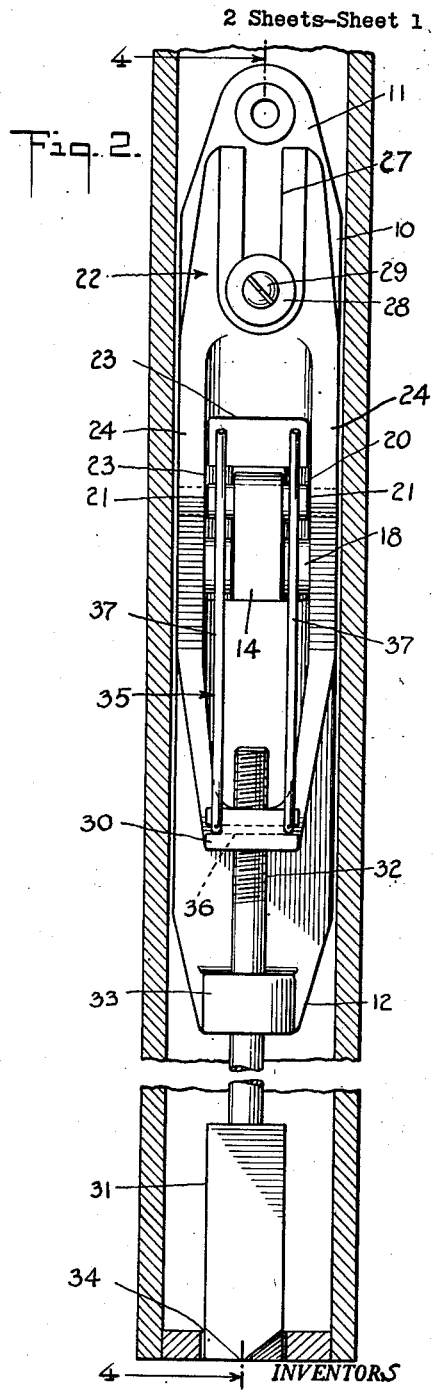
INVENTORS
M. M. Check
John P. Andrew
BY
A. H. Golden
ATTORNEY Dec. 10, 1957  M. M. CHECK ET AL  2,815,975
FLUSH BOLT FOR A DOOR
Filed Aug. 16, 1955 2 Sheets-Sheet 2
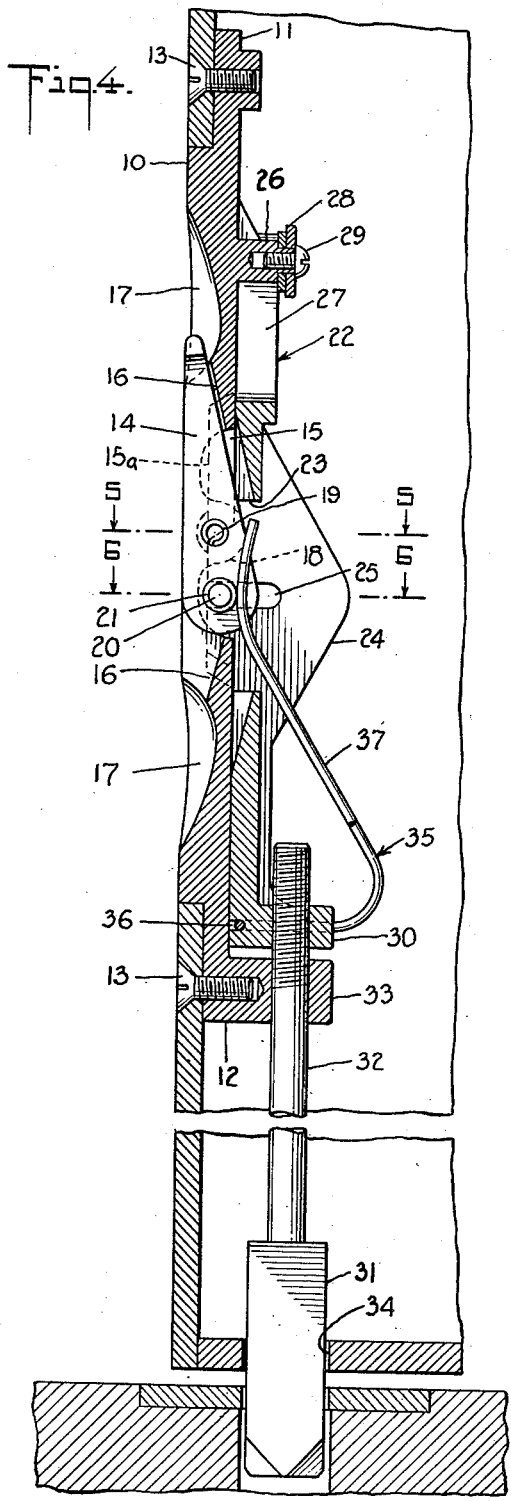
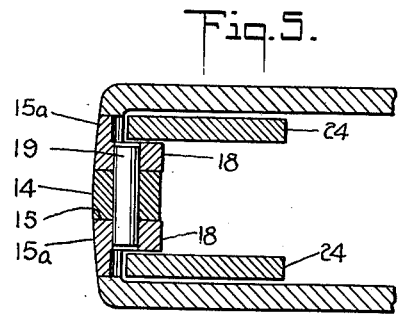
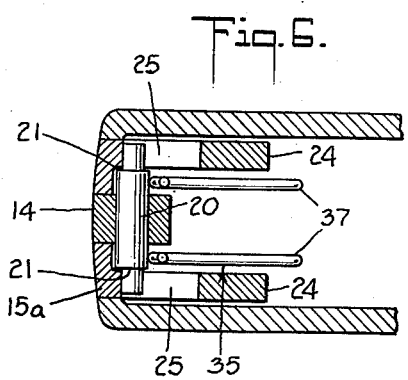
INVENTORS
M. M. Check
BY John P. Andrew
A.H.Golden
ATTORNEY

United States Patent Office 2,815,975
Patented Dec. 10, 1957

2,815,975

FLUSH BOLT FOR A DOOR

Mathias M. Check, Valley Forge, and John P. Andrew, Haverford, Pa., assignors to The Yale & Towne Manufacturing Company, Stamford, Conn., a corporation of Connecticut Application August 16, 1955, Serial No. 528,592

8 Claims. (Cl. 292—143)

This invention relates to a flush bolt for a door. Constructions of this class are very old in the art, and much effort has been expended in the development of various operating constructions. We have conceived a completely new and different combination of parts that yields extraordinarily good results. Thus, as a result of our concept, we are able to assemble a construction utilizing extremely simple means with practically no assembly tools.

Our flush bolt assembly includes a base and a bolt operator, together with a finger piece pivoted for movement between two opposed positions for actuating the bolt operator. As one feature of our invention, the bolt operator is mounted for sliding movement on the base through means extending between the base and the operator at one point, and through a bolt threaded into the operator and sliding relatively to a bearing opening in the base. In this way, the bolt serves as part of the means mounting the bolt operator for sliding movement relatively to the base.

As a further feature of the invention the finger piece is equipped with an operating part that is preferably in the form of a pin, it being merely necessary to apply an open end slot of the bolt operator against the pin to effect assembly of the finger piece and the bolt operator, after which the bolt and the other means extending between the operator and the base hold the bolt operator for effective sliding movement.

As a still further feature of our invention, we utilize a spring that moves with the bolt operator, the spring being applied at all times to the finger piece, and preferably to the pin actuated by the finger piece, to press the finger piece into one or the other of its two opposed positions.

As a still further and more particular feature of the invention, the spring is retained on the bolt operator through mounting in a groove formed in a surface of the bolt operator that is in sliding contact with the base. Thereby, the spring is always retained in place for movement with the bolt operator and without the need for complicated assembly mechanism.

We have thus outlined rather broadly the more important features of our invention in order that the detailed description thereof that follows may be better understood, and in order that our contribution to the art may be better appreciated. There are, of course, additional features of our invention that will be described hereinafter and which will form the subject of the claims appended hereto. Those skilled in the art will appreciate that the conception on which our disclosure is based may readily be utilized as a basis for the designing of other structures for carrying out the several purposes of our invention. It is important, therefore, that the claims be regarded as including such equivalent constructions as do not depart from the spirit and scope of our invention in order to prevent the appropriation of our invention by those skilled in the art.

In the drawings:

Fig. 1 shows our novel flush bolt assembly mounted on a door.

Figs. 2 and 3 show rear and side views of our bolt assembly in mounted position.

Fig. 4 is a longitudinal section taken on line 4—4 in Fig. 2.

Figs. 5 and 6 are sections on the lines 5—5 and 6—6 in Fig. 4.

Referring now more particularly to the drawings, we utilize in our novel assembly a base member 10 that is adapted to be mounted on the front edge of a door. For the purpose of disclosure, we show the base member 10 constructed particularly for mounting on a hollow metal door, with upper and lower end flanges 11, 12 secured against the inner surface of the door through screws 13. The front of the base member, that we finish to provide a decorative appearance, is then positioned in an opening in the door. On the base member 10 of our novel bolt assembly is a finger piece 14 that rotates between opposed positions, as will be understood by those skilled in the art. The base member 10 is formed with an opening 15 through which the finger piece 14 extends, as best seen in Fig. 4, and we prefer to recess the back of the base member at each side of opening 15 to form relatively thin portions 15a on the member, Figs. 3, 5, and 6. The front of base member 10 has slots 16 for the finger piece 14 above and below the opening 15, thus enabling the finger piece in either of its opposed positions to lie in flush relation to the base member 10. The front of base member 10 further has upper and lower finger recesses 17 that facilitate the manipulation of the finger piece.

For mounting the finger piece 14 on the base member 10, we form that member with a pair of lugs 18 that extend rearwardly from the portions 15a at opposed sides of opening 15, as well shown in Figs. 4 and 5. A pivot 19 is positioned in openings in these lugs 18 and the finger piece 14. We further utilize a pivot pin 20, well shown in Figs. 2 and 6, that is positioned in an opening in the inner end of the finger piece 14 whereby to rotate with the finger piece about pivot 19. For reasons that will appear, we make pivot pin 20 sufficiently long to project a considerable distance at either side of finger piece 14. Moreover, we reduce each end of pin 20 whereby to form shoulders 21 on the pin.

Our novel flush bolt assembly has further a bolt operator 22 that is adapted to slide on the rear surface of the base member 10, and that is formed with a relatively wide medial opening 23 providing clearance relatively to the inner end of finger piece 14, as is best seen in Fig. 2. At the opposed sides of its medial opening 23, bolt operator 22 has a pair of flanges 24. These flanges 24 are juxtaposed to the outer sides of the pivot lugs 18, as shown in Fig. 5, and preferably are so arranged as to overlie the ends of finger piece pivot 19 whereby they are adapted to hold that pivot 19 in assembled position.

In each of the flanges 24 on bolt operator 22 we form a horizontal slot 25 for a corresponding end of the pivot pin 20. Thus, the finger piece 14 when rotating will act through its pin 20 to slide the bolt operator 22 on base member 10. We particularly form the slots 25 to be open at their front ends, thus enabling operator 22 to be very readily assembled relatively to pin 20. It may be observed here that the side flanges 24, when in assembled position, are adapted to hold pivot pin 20 assembled since they are then in opposed relation to the shoulders 21 on pin 20, as shown in Fig. 6.

For holding the bolt operator 22 assembled in sliding relation to base member 10, we form the upper portion of the base member with a rearwardly extending stud 26 that engages in an open ended slot 27 in the upper end of operator 22, all as shown in Fig. 4. On the stud 26 is a retainer 28 that may take the form of washers that are held by a screw 29 in opposed relation to the back of the bolt operator 22. Also as shown in Fig. 4, we form the lower end of bolt operator 22 with a rearward portion 30 having a threaded vertical opening. We utilize in our assembly a bolt 31 having a threaded rod portion 32, and, by engagement of this rod portion 32 in the opening of the operator portion 30, the bolt will move vertically with the operator 22. Further, we form on the lower end of base member 10 a lug 33 having a vertical opening in which the bolt rod 32 slides. Thereby the rod 32, together with the stud 26 on the upper portion of base member 10, will hold the bolt operator 22 assembled in sliding relation to base member 10.

Through the arrangement that we have just described, it is possible to assemble bolt operator 22 relatively to base member 10 merely by slipping the upper end of operator 22 behind the washer 28 on stud 26, then tilting the operator 22 into assembled position against base member 10, and inserting bolt rod 32 into position in the openings in lugs 30, 33. Thereafter, when the bolt assembly is mounted on the door, bolt 31 will be positioned in an opening 34 in the bottom of the door, as will be understood by those skilled in the art. By its engagement in opening 34, the bolt 31 will hold the threaded rod 32 against rotation so that the bolt will not change its position relatively to bolt operator 22.

We hold the finger piece 14 in either of the positions to which it rotates through a U-shaped wire spring 35 so mounted that it can be assembled merely through the assembly of the bolt operator 22 to base member 10. For the particular purpose, we form the lower end portion 30 of the bolt operator 22 with a groove 36, Figs. 3 and 4, that extends across the front surface of the bolt operator and also rearwardly along the sides of the portion 30. A part of the spring 35 is adapted to lie in the groove 36, with arms 37 on the spring then extending upwardly and forwardly to lie intermediate the flanges 24 on bolt operator 22, as shown in Figs. 2 and 6. It will be observed that the base member 10 closes the front side of groove 36 when bolt operator 22 is in assembled relation to member 10. Thus, member 10 and operator 22 together are adapted to hold the spring 35 in the groove 36. The spring arms 37 are then in position to press the pivot pin 20 against the rear surface of the base member 10, with the finger piece in either of its rotated positions. Naturally, the spring arms 37 will yield when the pin 20 moves in the slot 23 whereby to enable the finger piece 14 to slide the operator 22 on base member 10.

We have conceived by our invention a novel flush bolt assembly that operates extremely well, but that is nevertheless rather simple and is very easily assembled without tools. Through our novel construction, the bolt operator can be utilized not only to move the bolt but also to hold in assembled position the finger piece pivots and the spring. The bolt operator in turn will be held assembled merely through the bolt. When assembled in that way, the several parts of our novel assembly will be held very securely in position and will give exceedingly good service. We believe, therefore, that those skilled in the art will appreciate the very considerable value of our invention.

We now claim:

1. In a flush bolt assembly, a base having a decorative front surface, a bolt operator formed to slide on the back of the base, means holding one end of said operator in sliding relation to the base, a bolt guide on said base, a bolt slidable on said guide, means securing the bolt to the end of the bolt operator that is opposed to said one end to hold said opposed end in sliding relation to the base, said bolt acting through the securing means to hold said operator assembled to the means that hold said one end of the operator, a finger piece rotatably mounted on said base, means through which the bolt operator when held assembled by the bolt is in coacting relation to the finger piece so that the finger piece by rotating will move the bolt, and a spring secured to the bolt operator and pressing the finger piece to opposed positions corresponding to projected and retracted positions of the bolt.

2. In a flush bolt assembly, a base having a decorative front surface, a bolt operator formed to slide on the back of the base, means holding one end of said operator in sliding relation to the base, a bolt guide on said base, a bolt slidable on said guide and secured to the opposed end of the bolt operator whereby to hold said operator assembled with its said opposed end in sliding relation to the base, a finger piece, means rotatably mounting said finger piece on said base, a pin rotating with said finger piece, said bolt operator having slots engaging the ends of said pin when the operator is applied to the base so that the finger piece by rotating will move the bolt, and a spring pressing the finger piece to opposed positions corresponding to projected and retracted positions of the bolt.

3. In a flush bolt assembly, a base having a decorative front surface, a finger piece, a pivot mounting the finger piece for rotation on the base, a bolt operator formed to slide on the back of the base, means holding one end of said operator in sliding relation to the base, said base formed with a bearing opening for a bolt, a bolt mounted to slide in said bearing opening and secured to that end of the operator that is opposed to said one end whereby to hold the operator assembled to the base, a pin rotating with said finger piece, flanges on the bolt operator coacting with opposed ends of the finger piece pivot when the operator is applied to the base whereby to hold said pin assembled to the finger piece, said flanges formed with slots engaging said pin when the operator is applied to the base so that the finger piece by rotating will move the bolt through said operator, said bolt operator having in sliding engagement with the base a surface that is formed with a groove, a spring positioned in said groove whereby to be secured to the bolt operator through the assembly of said operator to the base, and a part of said spring pressing the finger piece toward positions corresponding to the retracted and projected positions of the bolt.

4. In a flush bolt assembly, a base having a decorative front surface, a finger piece, means rotatably mounting said finger piece on said base with said finger piece accessible through an opening in said decorative front surface, a bolt operator adapted to be assembled to the base, surfaces whereby the bolt operator when assembled is in sliding relation to the back of said base, an operating pin extending laterally from said finger piece, said bolt operator having an open end slot applied to said operating pin through movement of the operator into assembled relation to the back of the base, said pin and slot then coacting so that the rotation of said finger piece imparts sliding movement to said bolt operator, a spring secured on said sliding bolt operator and bearing at all times on said laterally extending operating pin whereby to urge said finger piece to one or the other of opposed rotated positions relatively to said base, a bolt threaded into said bolt operator, and said base having a guide for said bolt whereby to guide the operator for sliding on said base.

5. In a flush bolt assembly, a base having a decorative front surface, a finger piece, means rotatably mounting said finger piece on said base with said finger piece accessible through an opening in said decorative front surface, a bolt operator adapted to be assembled to the base, said bolt operator having a surface that is in sliding relation to the back of the base when the operator is assembled, an operating pin extending laterally from said finger piece, a part on said bolt operator having an open ended slot applied to said operating pin through movement of the operator into assembled relation to the back of the base, said pin and slot then coacting so that rotation of the finger piece imparts sliding movement to the bolt operator, a groove formed in the surface of the operator that slides on the back of the base, a spring assembled in said groove and retained therein by the closing of the groove by the base when the operator is assembled to the base, a part of said spring bearing at all times on the laterally extending operating pin whereby to urge said finger piece to one or the other of opposed rotated positions relatively to the base, a bolt threaded into said bolt operator, and said base having a guide for said bolt whereby to guide the operator for sliding on the base.

6. In a flush bolt assembly, a base having a decorative front surface, a finger piece, means rotatably mounting said finger piece on said base for movement between opposed positions in each of which it is substantially flush with the decorative front surface of the base, an operating pin extending laterally from that end of said finger piece opposite the finger contacting end thereof, said laterally extending pin lying against a back surface of the base when the finger piece is in one of its opposed positions, a bolt operator adapted to be assembled to the base, said bolt operator having a surface that is in sliding relation to the back of said base when the operator is assembled, a part on said bolt operator having an open end slot engaging the laterally extending operating pin through movement of the operator into assembled relation to the back of the base, said pin and slot then coacting so that rotation of the finger piece imparts sliding movement to the bolt operator, means holding one end of said operator in assembled relation to the base, a rod guide bore on said base, and a bolt rod sliding in said bore and threaded into the other end of said operator to guide the operator as it slides relatively to the base.

7. In a flush bolt assembly, a base having a decorative front surface, a finger piece, means rotatably mounting said finger piece on said base with the finger piece accessible through an opening in said decorative front surface, a bolt operator adapted to be assembled to the base, said bolt operator having a surface in sliding relation to the back of the base when the operator is assembled, an operating pin extending laterally from said finger piece, said bolt operator having an open ended slot applied to said operating pin through movement of the operator into assembled relation to the back of the base, said pin and slot then coacting so that rotation of the finger piece imparts sliding movement to said bolt operator, a groove formed in the surface of the operator that is in sliding relation to the base, said groove closed by the base when the operator is assembled, a spring assembled in said groove and retained therein through the closing of the groove by the base, a part of said spring bearing at all times on the laterally extending operating pin whereby to urge the finger piece to one or the other of opposed rotated positions relatively to the base, and a bolt threaded into said bolt operator whereby to move with the operator as it slides on the base.

8. In a flush bolt assembly, a base having a decorative front surface, a finger piece, means rotatably mounting said finger piece on said base with said finger piece accessible through an opening in said front decorative surface, a bolt operator adapted to be assembled to the base, a surface on the bolt operator in sliding relation to the back of said base when the operator is assembled, an operating pin through which said finger piece is effective for imparting sliding movement to the bolt operator, a transversely extending groove formed in the surface of the operator that slides on the base with said groove closed by the base when the operator is assembled, a spring assembled in said groove and retained therein by the closing of the groove by the base whereby to move with the operator as it slides relatively to the base, a part of said spring bearing at all times on the operating pin whereby to urge the finger piece to one or the other of opposed rotative positions relatively to the base, a bolt on said bolt operator, and said base having a guide for said bolt.

References Cited in the file of this patent

UNITED STATES PATENTS

| | | |
|---|---|---|
| 510,781 | Gaedtke | Dec. 12, 1893 |
| 1,162,945 | Ohnstrand | Dec. 7, 1915 |

FOREIGN PATENTS

| | | |
|---|---|---|
| 24,030 | Australia | Apr. 27, 1936 |